United States Patent [19]
Kikinis et al.

[11] Patent Number: 5,721,936
[45] Date of Patent: Feb. 24, 1998

[54] TIMER-CONTROLLED COMPUTER SYSTEM POWER MANAGEMENT

[75] Inventors: Dan Kikinis, Saratoga; Pascal Dornier, Sunnyvale, both of Calif.

[73] Assignee: Elonex I.P. Holdings, London, United Kingdom

[21] Appl. No.: 687,162

[22] Filed: Jul. 24, 1996

Related U.S. Application Data

[63] Continuation of Ser. No. 143,830, Oct. 27, 1993, Pat. No. 5,542,035.

[51] Int. Cl.$^6$ .................................. G06F 1/14; G06F 1/32
[52] U.S. Cl. .................... 395/750.05; 364/707; 364/492
[58] Field of Search .............................. 395/750, 750.01, 395/750.05; 364/707, 492, 483; 307/31, 66; 340/825.06

[56] References Cited

U.S. PATENT DOCUMENTS

| | | | |
|---|---|---|---|
| 4,165,532 | 8/1979 | Kendall et al. | 364/420 |
| 4,303,850 | 12/1981 | Juhasz et al. | 377/32 |
| 4,747,041 | 5/1988 | Engel et al. | 395/750 |
| 4,860,005 | 8/1989 | DeLuca et al. | 340/825.44 |
| 5,146,453 | 9/1992 | Nagler et al. | 370/16 |
| 5,167,024 | 11/1992 | Smith et al. | 395/375 |
| 5,218,704 | 6/1993 | Watts, Jr. et al. | 395/750 |
| 5,241,680 | 8/1993 | Cole et al. | 395/750 |
| 5,278,771 | 1/1994 | Nyenya | 364/492 |
| 5,315,499 | 5/1994 | Bilas et al. | 364/140 |
| 5,410,713 | 4/1995 | White et al. | 395/750 |
| 5,428,547 | 6/1995 | Ikeda | 364/474.16 |
| 5,475,847 | 12/1995 | Ikeda | 395/750 |
| 5,502,339 | 3/1996 | Hartig | 307/31 |

*Primary Examiner*—Gopal C. Ray
*Attorney, Agent, or Firm*—Donald R. Boys

[57] ABSTRACT

A system for managing power levels for a general purpose computer having a standby and a full-power mode of operation provides apparatus and a method for monitoring times of user input and control routines for using the times of user input to calculate optimum times for initiating full power operation and standby mode. The control routines are configured to provide the optimum times to a real time clock that remains powered in the standby mode, which triggers switching elements to initiate full power and standby mode. In one embodiment of the system, startup and standby may be initiated either by user input or automatically by the power management system. Startup and standby initiation times may be different for different days and time periods based on both preprogrammed and calculated values.

13 Claims, 3 Drawing Sheets

TIMER-CONTROLLED COMPUTER SYSTEM POWER MANAGEMENT

This is a continuation of application Ser. No. 08/143,830, filed Oct. 27, 1993, U.S. Pat. No. 5,542,035.

FIELD OF THE INVENTION

The present invention is in the area of power control methods and apparatus for computer systems and pertains more specifically to automatically timed startup and shutdown of such systems.

BACKGROUND OF THE INVENTION

In a society increasingly dependent on computer systems, power conservation has become an important issue. Personal computers are therefore being designed to minimize power consumption. In a power-saving computer there may be as many as four or more operating modes with greatly varying power consumption. A first mode, which may be called peak mode, provides the power-on surge, which may be, for example, 90 watts. A second mode, which may be called normal mode, supports routine computer operations with full expansion capabilities at, for example, about 50 watts. A third mode, which may be called suspend mode, powers down computer processing activity but retains random access memory (RAM) at a lower power level, which in this example may be about 10–15 watts. A fourth mode, which may be called standby mode, powers down everything except a wakeup circuit, in this example about 1–2 watts.

To work at optimum efficiency the ratio of minimum to maximum load for a power supply in a personal computer should not exceed about 1:6. But, as described above, a power-saving computer may consume as little as 1–2 watts in standby mode and 90 watts or more during power-on, a ratio of as much as 1:90 or higher.

As a power conservation measure, simple timer switches can be used to automatically turn computers off after hours and turn them back on at the start of the next business day. But the use of such automatic timer-switch controls is not without problems. Workers may not always be ready to save their work before the designated shutdown time and important data may be lost. Also, rigidly imposed shutdown times may have an adverse effect on worker creativity. Often having "just a few more minutes" is just what is needed to finish a job. In addition, workers who may come in early or are authorized to work on other-than-normal business hours may find they cannot access their computer systems.

What is needed is an automatic timer-controlled system that is both flexible and energy-efficient. Such a system should track individual computer activity throughout the work day and automatically adjust startup and shutdown times to user's schedules. Continuous tracking and adjustments would allow companies to provide reasonable and comfortable time boundaries for each employee. Also adjustments could easily be made for variables such as shift work, holidays, and Daylight Savings Time.

SUMMARY OF THE INVENTION

In a preferred embodiment of the present invention, a system for managing power levels for a general-purpose computer is provided having an electrically operable power switching means for switching power between a full-power mode and a standby power mode drawing less than full power. The system includes a real time clock remaining powered in the standby power mode, and control means including logic routines operable in the full-power mode for providing initiation times for the startup and the standby power modes to the real time clock. The real time clock provides a first signal to the power switching means to initiate standby mode and a second signal to initiate full-power mode based on specific times provided to the real time clock by the control means.

In some embodiments of the invention standby and full-power modes may be initiated either by the real time clock with times provided by the control means, or alternatively by user input, such as by specific keystroke signals at a keyboard or use of a pointer device. In other embodiments, time of user activity is used by the control means through logic routines to calculate optimum initiation times for full-power and standby modes.

DESCRIPTION OF THE PREFERRED EMBODIMENTS

Figure 1:
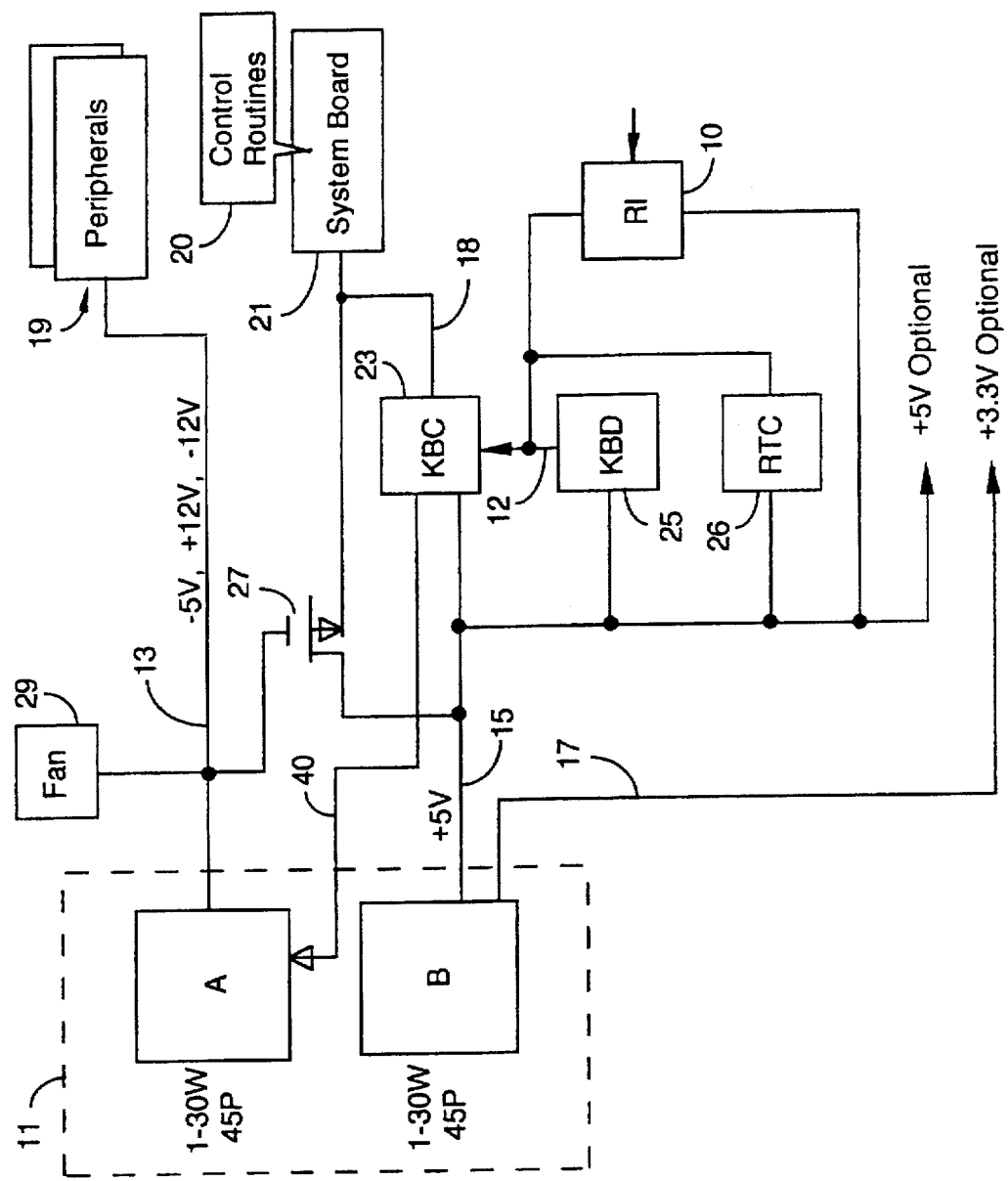
FIG. 1 is a block diagram for a system configuration according to an embodiment of the present invention.

FIG. 1 is a block diagram of a system configuration for an embodiment of the present invention. The power supply configuration in this embodiment comprises a highly efficient power supply subsystem using two power supplies for supporting greatly varying power consumption in four operating modes as described in the Background section above. It is known to the inventors to provide such a configuration comprising a dual power supply unit 11 having power supplies A and B. Power supply A in this configuration is termed a Command supply, and power supply B, a Main supply.

The configuration of FIG. 1 supports an arbitrary total peak power consumption of about 90 watts in this example with power being divided between the two units, which allows optimal equalized distribution not possible with a single-source power supply.

Command supply A provides regulated voltages on line 13 of −5, +12, and −12 volts to system peripherals 19 at a peak of about 45 watts, and is connected in addition by line 13 to the operating element of a solid-state switch 27 which supplies power to system board 21 through normally open contacts from power supply B. Main supply B provides regulated voltage on path 15 of +5 volts and +3.3 volts, also with a peak capacity of 45 watts. Main supply B in this embodiment powers system board 21 through switch 27 as described above, which in turn operates all related bus, memory, and microprocessor power requirements, and also powers keyboard controller (KBC) 23, keyboard 25, and real time clock (RTC) 26. Power supplies A and B are provided with primary power originally through a manual switch not shown in FIG. 1, but after original power up, control is through the present startup and shutdown control system.

In this hardware configuration, the power subsystem goes to standby mode by a signal on line 40 from KBC 23, which operates a solid-state switch to turn off primary power to power supply A. In standby mode only command supply A is shut down while main supply B remains active. KBC 23, KBD 25, and RTC 26 remain powered by line 15 from power supply B, and system board 21 loses power because switch 27 opens when line 13 loses power. Although not shown in FIG. 1, in systems using a pointer device, the pointer device is also active in standby as is the KBD. A suspend mode, as described in the Background section, may be supported through a separate signal on line 18 from KBC 23, bypassing the usual supply to the system board through switch 27.

In some embodiments the hardware configuration may include a ring indicator (RI) 10 for a fax system or other modem-type device. RI 10 may be powered from line 15 as shown in FIG. 1, or may be separately powered, and has an output to KBC 23 as do KBD 25 and RTC 26 on line 12. In these embodiments, an incoming call or fax wakes up the system, which may then respond by receiving and processing the incoming data. After the incoming data is processed, the system may be programmed to return to a standby or suspend mode.

It will be apparent to those with skill in the art that there are many other hardware configurations useful for providing a standby mode and other less-than-full-power modes. One may, for example, switch individual components on and off between a single power supply and each individual component, or similarly switch groups of components.

In standby mode with the hardware configuration of FIG. 1, KBD 25 (and a pointer, if used), RTC 26, KBC 23, and RI 10 (if used) constitute a wake-up circuit. Upon system activity at KBD 25 (or a pointer device) signalled on line 12, or on signal from RTC 26 also on line 12, or on signal from RI 10, also on line 12, KBC 23 may signal power supply A on line 40 to power up, restoring full power to the system.

In the embodiment of the invention shown in FIG. 1, timed shutdown to standby level and subsequent startup of the system is provided by RTC 26, which, although shown as powered by power supply B, may also be battery powered to maintain function when all power is lost. Shutdown and startup times are provided to RTC 26 by power management control routines represented in FIG. 1 by routines 20 associated with system board 21. The power management control routines in this embodiment, referred to as Timer-Controlled Power Management (TCPM) routines, may reside in system BIOS, as a separate system controller, or as a peripheral on the system expansion bus that is wired to the real time clock. The TCPM routines only run when the power system is fully powered or in a suspend mode; that is, when system board 21 is powered.

The TCPM routines are configurable to set startup times for normal business days, for weekends, for holidays, and also may be tailored in various embodiments to provide automatic adjustment of startup and shutdown times according to specific events.

As an example of an automatic adjustment, in one embodiment the TCPM routines have an ability to extend the shutdown time incrementally according to user activity. In this embodiment, assuming a particular day and default shutdown time, at shutdown time minus 5 minutes, the system begins to monitor user activity. If no input activity is monitored, the shutdown time in the RTC remains the default time, and the RTC signals the system at that time to go to standby mode. If user input is recorded within the 5 minute window before default shutdown time, the TCPM routines add 5 minutes to the default, send that time to the RTC, and continue to monitor for user input. Shutdown only then occurs if a period of time passes greater than 5 minutes without user input.

In this manner, a user is less likely to be surprised when the system automatically goes to standby. It will be apparent to those with skill in the art that the 5 minute example is arbitrary, and other times, and variable times, could also be employed.

As another example, the TCPM routines may be programmed to start the system from standby each morning at a programmed default time, such as at 7:00 a.m. for a business day. The system will also start before 7:00 a.m. if user input is detected. In one embodiment the TCPM routines record the startup time each day if activated by a user, and over a period of record a new default time is calculated tailored to the particular usage pattern of the individual user.

It will be apparent to one with skill in the art that an embodiment of the invention configured to shut down based on periods of inactivity, and to start based on logged data of user activity, need have no direct input for setup. In most cases, however, means is provided for an administrator to access the TCPM routines and make certain default settings, and in some cases to select specific management routines in preference to others available, or even to tailor new management routines.

Figure 2:
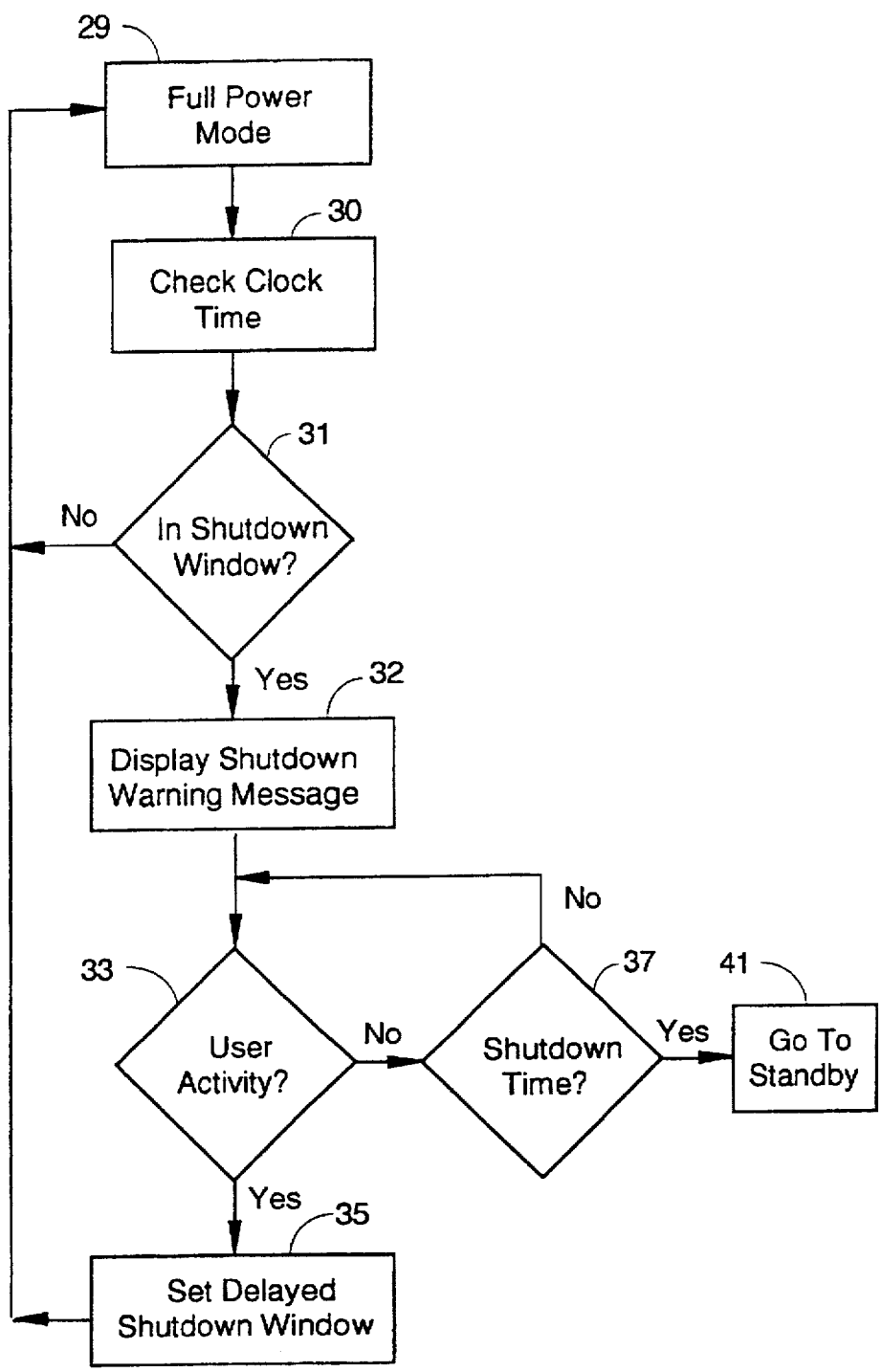
FIG. 2 is a logic flow diagram of timer-controlled shutdown according to the embodiment of FIG. 1.

FIG. 2 is a logic flow diagram of the basic shutdown function described above, where shutdown actually is standby mode. A shutdown time window as described above, being a certain number of minutes before a default shutdown time, is programmed into the real time clock's addressable program registers by the TCPM routines. In full-power mode 29 the real time clock continually monitors the time at function 30. When real time enters the shutdown time window at decision point 31, an onscreen shutdown warning message is optionally issued at function 32 so the user can do an orderly closure of files for the day. Throughout this shutdown time window, user activity is monitored at decision point 33. If no user activity is detected within the shutdown time window and shutdown time is reached at function 37, operations are shut down to standby mode at function 41.

If any user activity is detected within the shutdown time window at function 33, shutdown is delayed at function 35 by extending the shutdown time beyond the default shutdown time. Delay shutdown looping continues until no user activity is detected within the latest delayed time window, at which time the system is shut down to standby mode.

Figure 3:
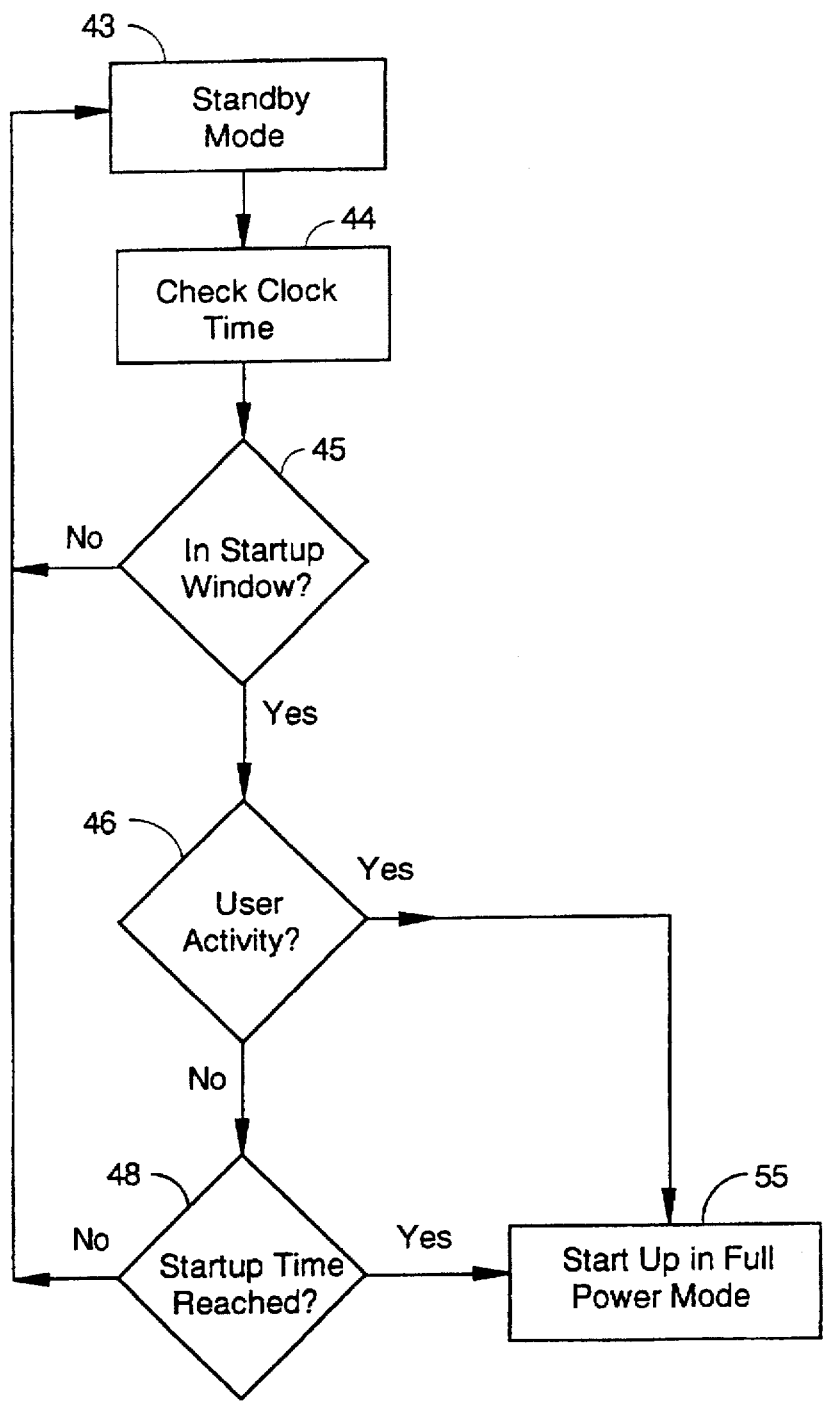
FIG. 3 is a logic flow diagram of timer-controlled startup according to the embodiment of FIG. 1.

FIG. 3 is a logic flow diagram of startup in an embodiment as described above. While the computer is in standby mode at function 43, the KBD (and pointer), KBC and RTC remain powered. The RTC monitors at function 44 whether time is in a programmed startup window at function 45. There may either be a programmed startup window, or all the time in standby may be considered a startup window.

If time is in the startup window and user activity is detected at decision point 46, the computer starts in full-power mode at function 55. As soon as the computer is started in full-power mode, the TCPM routines start running. The TCPM routines monitor system activity and record all shutdown and startup times. If there is a consistent trend of earlier or later startups or shutdowns over a number of days, the routines automatically adjust the startup initiation time. If user activity is not detected prior to clock time reaching the startup default time at decision point 48, the computer starts in normal mode at function 55 at the default startup time.

In an alternative embodiment of the invention, an onscreen menu interface adds flexibility to the TCPM functions described in FIGS. 2 and 3 by allowing the user to specify timing control conditions and parameters while the system is operating in normal mode. The format of such an interface and the functions it performs may vary widely, and the mechanisms by which such onscreen inputs may be made are well known in the art, and need not be fully described here.

In a further embodiment, the TCPM routines may provide secured access control for networked computer users through an onscreen menu interface. Varied degrees of control can be maintained by a system administrator, from free access for selected computer users to strictly regimented shutdown and startup schedules and security access procedures across the entire network.

It will be apparent to one skilled in the art that there are a relatively large number of changes that may be made in the embodiments described without departing from the spirit and scope of the present invention. There are, for example, a number of equivalent ways that several alternatives may be implemented to expand the functions and improve the efficiency of timer-controlled shutdown and startup of computer systems. There are similarly a variety of vehicles where the TCPM routines may reside and operate, and it is only needed for purposes of embodiments of the invention that the RTC for a controlled system or systems be accessible to set the startup and shutdown times.

What is claimed is:

1. A system for managing power levels for a general-purpose computer, comprising:

power management routines for providing multiple power levels;

power-switching circuitry for switching between power levels;

a real time clock; and control logic routines operable for providing initiation times-of-day for changing the power levels;

wherein the real time clock provides a signal to the power-switching circuitry to initiate a change in power level based on a specific time of day.

2. A system for managing power levels for a general-purpose computer as in claim 1 further comprising input means including a microprocessor-based controller remaining powered in standby mode, wherein the microprocessor-based controller signals power-level changes in response to signals from one of the real time clock and the input means.

3. A system for managing power levels for a general-purpose computer as in claim 2 wherein the input means comprises a keyboard and the microprocessor-based controller is configured to initiate different power levels in response to specific keystroke signals input by a user.

4. A system for managing power levels for a general-purpose computer as in claim 2 wherein the logic routines are configured to monitor user input events and to adjust power-level changing times-of-day based on the user input events.

5. A system for managing power levels for a general-purpose computer as in claim 1 wherein power levels are selected for peripheral devices.

6. A general-purpose computer comprising:

power management routines for providing multiple power levels;

power switching circuitry for switching between power levels;

a real time clock; and control logic routines operable for providing initiation times-of-day for changing the power levels;

wherein the real time clock provides a signal to the power-switching circuitry to initiate a change in power level based on a specific time of day.

7. A general-purpose computer as in claim 6 further comprising input means including a microprocessor-based controller remaining powered in standby mode, wherein the microprocessor-based controller signals power level changes in response to signals from one of the real time clock and the input means.

8. A general-purpose computer as in claim 7 wherein the input means comprises a keyboard and the microprocessor-based controller is configured to initiate different power levels in response to specific keystroke signals input by a user.

9. A general-purpose computer as in claim 7 wherein the logic routines are configured to monitor user input events and to adjust power level change times-of-day based on the user input events.

10. A general-purpose computer as in claim 6 wherein power levels are selected for peripheral devices.

11. A method for managing power levels for a general-purpose computer, comprising steps of:

monitoring user input through logic routines for determining startup initiation and standby initiation times-of-day based on times-of-day of the user input;

providing the initiation times-of-day to a real time clock; and signaling for changing power levels by output from the real time clock to power switching circuitry adapted to change power levels for the general-purpose computer.

12. The method of claim 11 wherein the computer includes one or more input devices, such as a keyboard, a pointer device, and a ring indicator, and wherein in the step for monitoring user input the logic routines monitor the input devices in a pre-programmed time window immediately preceding the standby initiation times-of-day, and delay the initiation time for standby by a pre-programmed time duration if input activity is sensed in the time window.

13. The method of claim 11 further comprising a step for monitoring user input events through the logic routines, and adjusting the initiation times-of-day based on the times-of-day of the user input events.

* * * * *